United States Patent
Menacho

(10) Patent No.: US 8,961,863 B2
(45) Date of Patent: Feb. 24, 2015

(54) HEAP LEACHING AERATION SYSTEM

(71) Applicant: Netafim, Ltd., Tel Aviv (IL)

(72) Inventor: Jorge Menacho, Santiago (CL)

(73) Assignee: Netafim, Ltd., Tel Aviv (IL)

( * ) Notice: Subject to any disclaimer, the term of this patent is extended or adjusted under 35 U.S.C. 154(b) by 209 days.

(21) Appl. No.: 13/722,584

(22) Filed: Dec. 20, 2012

(65) Prior Publication Data

US 2013/0106001 A1    May 2, 2013

Related U.S. Application Data

(63) Continuation-in-part of application No. PCT/IL2011/000485, filed on Jun. 19, 2011.

(60) Provisional application No. 61/356,664, filed on Jun. 21, 2010.

(51) Int. Cl.
  *C22B 3/00* (2006.01)
  *C22B 3/18* (2006.01)
  *C22B 3/02* (2006.01)
  *C22B 3/04* (2006.01)

(52) U.S. Cl.
  CPC ... *C22B 3/18* (2013.01); *C22B 3/02* (2013.01); *C22B 3/04* (2013.01)
  USPC ............................ 266/44; 266/168

(58) Field of Classification Search
  USPC .............. 266/44, 168; 75/743; 261/19, 20, 30
  See application file for complete search history.

(56) References Cited

U.S. PATENT DOCUMENTS

| 4,721,526 A | * | 1/1988 | Elmore et al. .................. 75/734 |
| 5,005,806 A | | 4/1991 | Krauth |
| 7,575,622 B2 | | 8/2009 | Crundwell et al. |
| 2004/0235141 A1 | | 11/2004 | Du Plessis |

FOREIGN PATENT DOCUMENTS

| WO | WO 00/71763 A1 | 11/2000 |
| WO | WO 2008/139430 A2 | 11/2008 |

OTHER PUBLICATIONS

International Search Report dated Oct. 20, 2011 issued in PCT counterpart application (No. PCT/IL2011/000485).
Written Opinion of the International Searching Aughority dated Oct. 20, 2011 issued in PCT counterpart application (No. PCT/IL2011/000485).

* cited by examiner

*Primary Examiner* — Robert A Hopkins
(74) *Attorney, Agent, or Firm* — Womble Carlyle

(57) ABSTRACT

An aeration system for a bed of ore that is laid upon a basal layer has a gas source located upstream for supplying gas and aeration pipes that distribute the gas downstream to the bed. Each aeration pipe has spaced-apart gas emitters that distribute gas to the bed and the aeration pipes extend through the bed towards the basal layer.

21 Claims, 3 Drawing Sheets

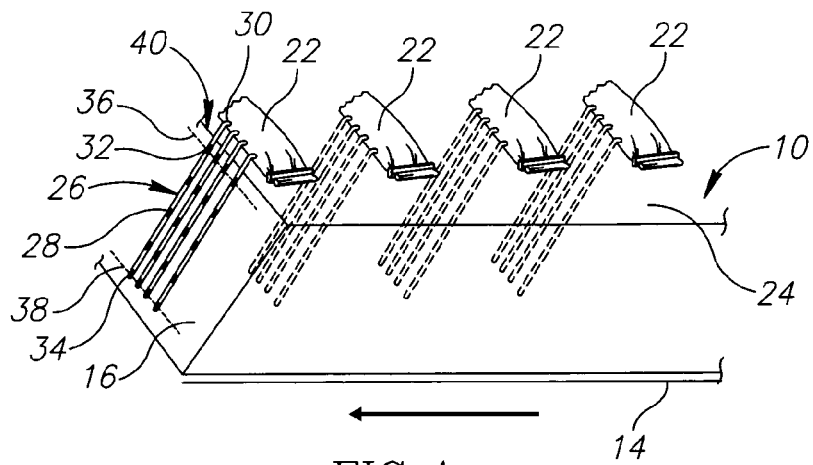
FIG.4
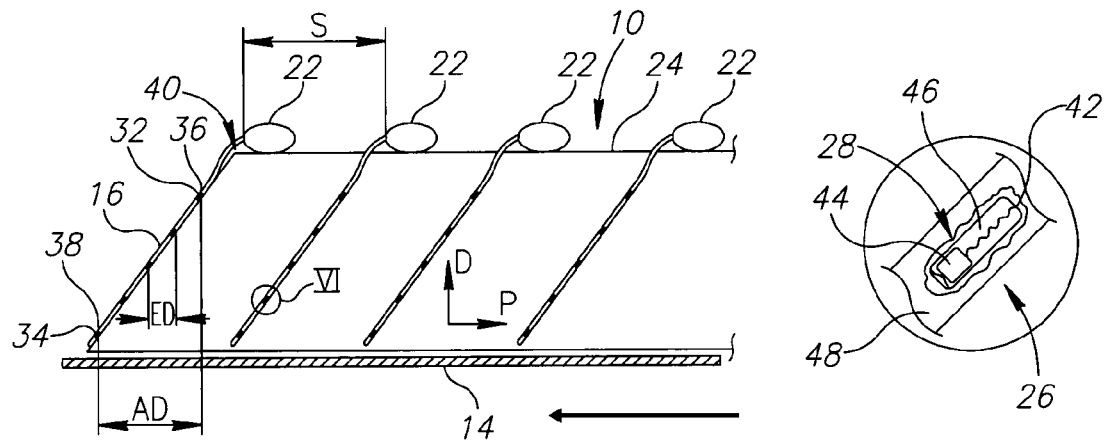
FIG.5
FIG.6
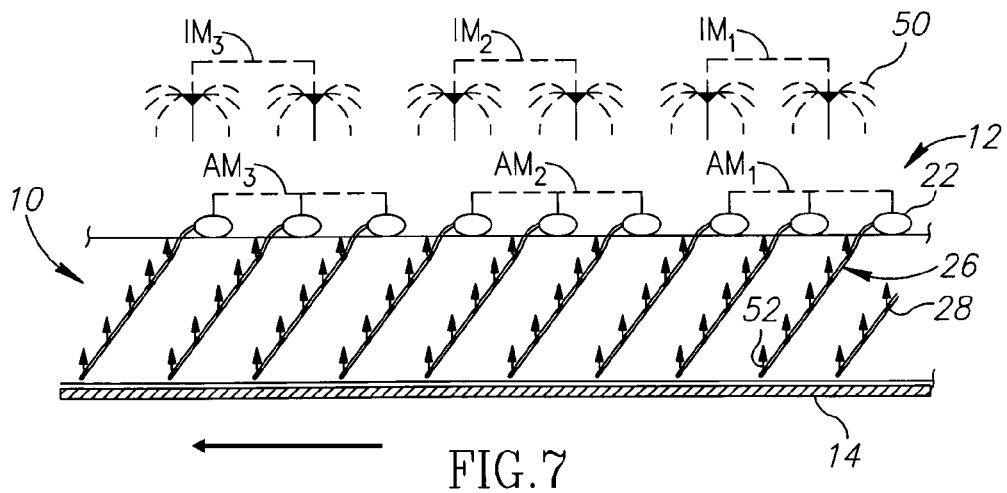
FIG.7

HEAP LEACHING AERATION SYSTEM

RELATED APPLICATIONS

This is a Continuation-in-part of International Patent Application No. PCT/IL2011/000485 filed 19 Jun. 2011, which published as WO 2011/161671A1 on 29 Dec. 2011, and claims priority to U.S. Provisional Application No. 61/356,664, filed 21 Jun. 2010. The aforementioned applications are incorporated by reference in their entirety.

TECHNICAL FIELD

Embodiments of the invention relate to a heap leaching aeration system for introducing aeration gas into a bed of ore that is being leached and to the installation of the aeration system in the bed of ore.

BACKGROUND

In heap leaching, a leaching solution is applied over a bed of ore in order to separate out of the ore a solution that includes metals present in the ore. The ore in the bed may be mined ore material that is crushed or ground into small chunks before being laid in the heap or may be run-of-mine (ROM) raw ore material that has not been crushed or ground.

Such separation of the solution out of the ore may be assisted by bacteria that require aeration of gas such as oxygen and carbon dioxide for their functioning and lack or absence of such aeration may decrease the bacterial activity resulting in less dissolution of metal out of the ore. Aeration may be necessary not only in bacteria-assisted leaching, but also in chemical-assisted leaching, such as cyanide leaching of gold ores, acid leaching of copper and nickel sulphides and chloride leaching of copper sulphide ores.

Heap leaching may be performed in a bed of ore that is dynamically formed for example on an impervious layer or on top of lower layers of ore material that have already been leached. Placing of the ore in such beds proceeds by depositing it upon a leading side face of the bed thus adding to the dynamic formation of the bed in the lateral side direction.

In some cases aeration gas may be urged into the bed of ore by for example perforated piping in order to increase the presence of gas in the bed and thereby enhance leaching rates in the bed. Such perforated piping is typically laid horizontally at the base of a heap and/or below a layer of ore and as a result may exhibit the following exemplary disadvantages: the ore that is laid above the piping may bear down against the piping and squash it, the gas emitted from such piping may not reach all of the ore that is located above it, and the large amount of gas required for enhancing the rate of leaching may result in such piping being of a relatively large diameter which makes this type of piping expensive and low-efficiency.

U.S. Pat. No. 5,030,279 describes a percolating system for circulating a leaching solution through a stationary ore mass. The percolating system includes a series of tubes that have spaced-apart emitters. The emitters are of the type having a labyrinth flow restricting passage and the tubes are positioned on an upper surface of the ore bed to emit the leaching solution directly into the ore. In the case where multiple layers of ore beds are laid one over the other, the percolation systems of the underlying beds are left intact and can be supplied with injected pressurized air instead of the leaching solution in order to enhance oxidation of the leaching solution being emitted from the percolation system that is laid upon the top bed.

U.S. Pat. No. 7,314,066 describes a bioleaching process that includes an aeration system through which air is added to sulfide heaps. The aeration system includes a plurality of air distribution pipes in the form of corrugated HDPE air pipes that are placed at the base of the heaps. Such air distribution pipes when used buried in a heap may exhibit air hole blocking and this patent describes several embodiments of air distributors that address this problem.

SUMMARY

The following embodiment and aspects thereof are described and illustrated in conjunction with systems, tools and methods which are meant to be exemplary and illustrative, not limiting in scope.

In an embodiment is provided an aeration system for a bed of ore, the bed being laid upon a basal layer and the aeration system comprising a gas source located upstream for supplying gas and aeration pipes for distributing the gas downstream to at least a portion of the bed, each aeration pipe comprises spaced-apart gas emitters for the distribution of the gas to the at least a portion of the bed, wherein the aeration pipes extend through the bed towards the basal layer.

Optionally, the bed is of the type that is progressively formed in a predetermined direction along the basal layer by additional ore being deposited over a progressing leading face of the bed that slopes towards the basal layer and at least some of the aeration pipes extend towards the basal layer along a path that has a slope generally similar to the slope of the leading face.

Optionally, the aeration pipes are laid upon the leading face of the bed as the bed is formed so that the additional ore deposited over the leading face during the formation of the bed covers the aeration pipes so that they extend through the bed.

If desired, a protective covering located along at least portions of each aeration pipe may shield the gas emitters from direct contact with the ore.

Typically, the aeration system comprises feed pipes that extend along the bed of ore and each feed pipe is coupled to a given group of aeration pipes.

Optionally, at least some of the gas emitters of each aeration pipe are effective emitters being covered by ore and each aeration pipe has a beginning and an end being respectively defined at the most distal and the most proximal effective emitter from the basal layer, an imaginary beginning line and an imaginary end line is defined extending respectively between the beginnings and the ends of a given group of aeration pipes that are attached to the same feed pipe, an effective emitter distance ED between adjacent gas emitters in an aeration pipe is measured along a direction generally parallel to the basal layer, and an effective aeration pipe distance AD between a beginning and an end line of a given group of aeration pipes is measured along a direction generally parallel to the basal layer, wherein an average spacing S between at least some adjacent feed pipes in the aeration system is sized such that S≤AD+ED+T, where T is a tolerance distance occurring due to side dispersion of the gas flow in the bed.

If desired, at least some of the gas emitters comprise each a flow-restricting path for reducing the pressure of gas exiting the emitters.

Optionally, at least some of the gas emitters are in the form of holes in the pipes through which gas freely exits the pipes.

Further optionally, the at least some of the gas emitters are adapted to evenly distribute gas along the pipe they are associated with.

If desired, the at least some of the gas emitters are adapted to non-evenly distribute gas along the pipe they are associated with.

Optionally, the non-even distribution is achieved by non-even spacing between at least some of those gas emitters.

Further optionally, the non-even distribution is achieved by different type flow-restricting paths that are comprised in at least some of those gas emitters.

In an embodiment there is also provided a method of using of an aeration system with a bed of ore comprising the steps of: providing a bed of ore that is adapted to be progressively formed in a predetermined direction along a basal layer by additional ore that is deposited over a progressing leading face thereof, periodically installing a group of aeration pipes of the system to the bed by placing the group upon the leading face of the bed and then depositing an additional covering layer of ore over the leading face in order to at least partially cover the group of aeration pipes, and depositing additional ore over the progressing leading face to continue the progressive formation of the bed.

Optionally, the ore that is added to the bed to cover the aeration pipes has a granular structure that is different from the granular structure of the other ore that is added to the bed.

Typically, the other ore that is added to the bed is run-of-mine raw material and the ore that is added to the bed to cover the aeration pipes is from the same material but after crushing or after removing the coarse lumps by classification.

Typically, the progressing leading face of the bed slopes towards the basal layer.

Optionally, the method comprises the step of associating a feed pipe of the system with each given group of aeration pipes, said feed pipe being in fluid communication with the aeration pipes in the given group and being adapted to supply those aeration pipes with gas.

Typically, the feed pipe is laid upon an upper face of the bed.

Optionally, the feed pipe is a collapsible pipe.

If desired, the aeration system is divided into aeration modules defining each a respective aerated portion in the bed, and the method also comprises the step of providing an irrigation assembly for irrigating the bed with a leach solution and the irrigation assembly is divided into irrigation modules defining each a respective irrigated portion in the bed, and wherein each aerated portion in the bed has an associated irrigated portion in the bed that is substantially the same portion in the bed.

In addition to the exemplary aspects and embodiment described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which:

FIG. 4 schematically shows a perspective view of a part of the bed of ore during its formation together with a part of the aeration system associated therewith;

FIG. 5 schematically shows a cross sectional side view of FIG. 4;

FIG. 6 schematically shows a section of FIG. 5;

FIG. 7 schematically shows a cross sectional side view of a bioleached portion of the bed of ore that is being aerated in accordance with embodiments of the present invention.

Figure 1:
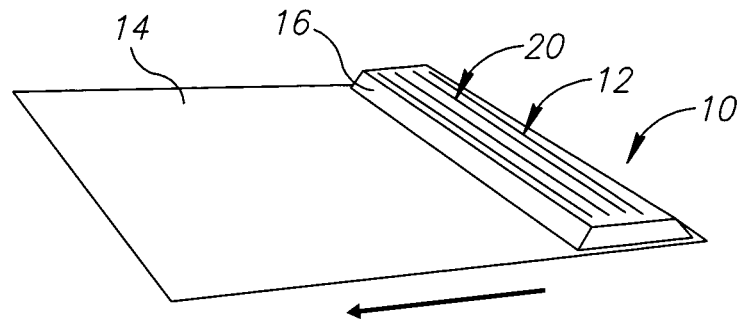
FIGS. 1 to 3 schematically show perspective views of different stages in the formation of a bed of ore with parts of an aeration system in accordance with an embodiment of the invention being implemented therewith.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 2:
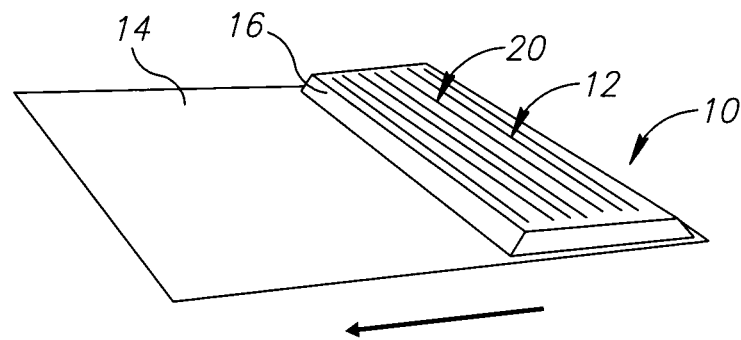
Figure 3:
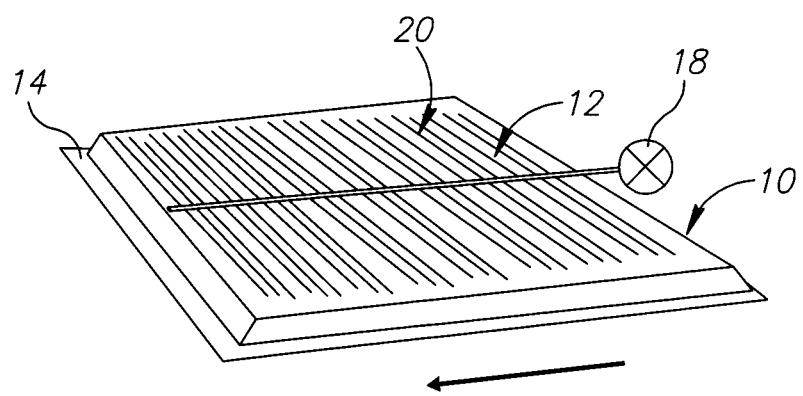

Attention is first drawn to FIGS. 1 to 3. A bed of metal laden ore 10 such as low-grade gold, silver, copper (etc.) that may utilize an aeration system 12 in accordance with an embodiment of the invention may be of the type that is dynamically formed on a basal layer 14. In one exemplary embodiment the basal layer 14 may be an impervious layer such as a sheet of plastic film (e.g., polyethylene), asphalt and/or compacted clay, (or the like); and in another exemplary embodiment the basal layer 14 may be the upper surface of an already leached bed of ore in a lower terrace, with or without compaction. The ore in the bed 10 may optionally be in the form of crushed ore that is crushed prior to being deposited or may be in the form of raw ore material that is taken from the mine and deposited in the bed as run-of-mine (ROM) ore material. The bed 10 may be progressively formed in a predetermined direction indicated by the arrow, along the basal layer 14, The bed 10 is progressively formed by additional ore that is placed for example by a stacker or trucks (both not shown) upon a progressing leading face 16 of the bed 10 that slopes down towards the basal layer 14, and during the formation of the bed 10 the aeration system 12 may be installed in the bed 10.

The aeration system 12 is adapted to introduce aeration gases such as air, oxygen, carbon dioxide, enriched air (etc.) into the bed 10, and the system 12 may include a gas source 18 located upstream and an array of pipes 20 for leading the aeration gases downstream and for emitting the aeration gases into the bed 10. It should be noted that directional terms appearing throughout the specification and claims, e.g. "forward", "rear", "up", "down" etc., (and derivatives thereof) are in relation to the basal layer 14 upon which the bed 10 of ore is formed. These directions are for illustrative purposes only, and are not intended to limit the scope of the appended claims. In addition it is noted that the directional terms "down", "below" and "lower" (and derivatives thereof) define identical directions.

Attention is now drawn to FIGS. 4 and 5. At least part of the array of pipes 20 that leads the aeration gases downstream into the bed 10 includes feed pipes 22 that extend alongside each other optionally upon an upper face 24 of the bed 10. In an embodiment, the feed pipes 22 are of the collapsible type that has a relatively thin walled flexible construction that may be deflated at any time that substantially no gas is flowing therethrough so as to ease for example installment and/or retrieval of the feed pipes 22 from the bed 10 for further reuse later on.

Figure 9:
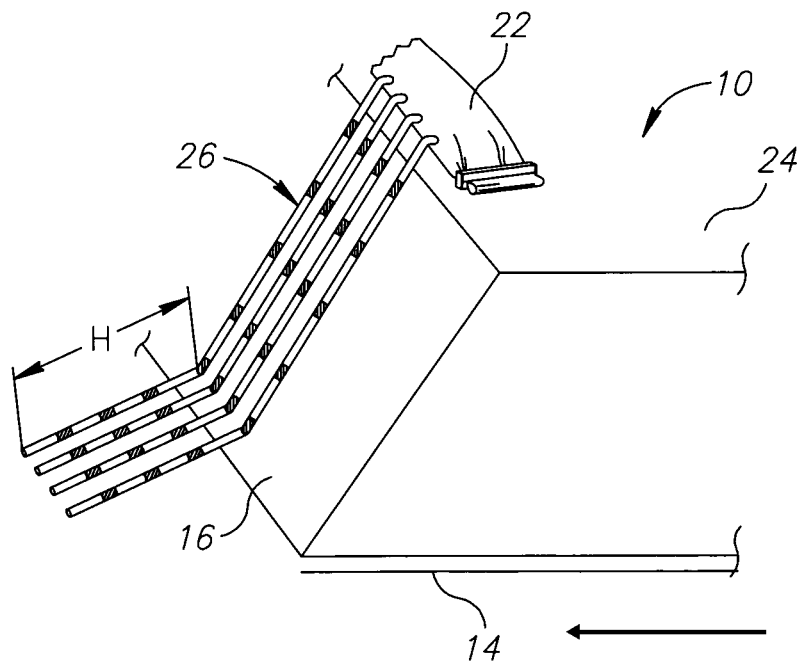

A group of aeration pipes 26, each incorporating spaced-apart gas emitters 28, extends down from each feed pipe 22 towards the basal layer 14. Each aeration pipe 26 extends through the bed 10 from a start 30 where it is attached to and in fluid communication with the feed pipe 22 towards the basal layer 14 along a path that is transverse to the basal layer 14. An effective beginning 32 of each aeration pipe 26 is defined at the location of the first gas emitter 28 most proximal to the start 30 of the aeration pipe 26 that is located in the bed 10 and covered by ore. An effective end 34 of each aeration pipe 26 is defined at the location of the last gas emitter 28 most distal from the start 30 of the aeration pipe 26 that is located in the bed 10 and covered by ore. Optionally, (as seen in FIG. 9) each aeration pipe 26 after sloping down along a path generally parallel to the leading face 16 towards the basal layer 14 extends an additional distance H horizontally along the basal layer 14.

The aeration pipes 26 in a given group extend alongside each other such that their starts 30 are spaced apart along their respective feed pipes 22. An imaginary beginning line 36 and an imaginary end line 38 of each group of aeration pipes 26 that are attached to a given feed pipe 22 are defined as extending respectively straight through (or proximal to) the beginnings 32 and the ends 34 of the aeration pipes 26 that are attached to the given feed pipe 22.

Figure 8:
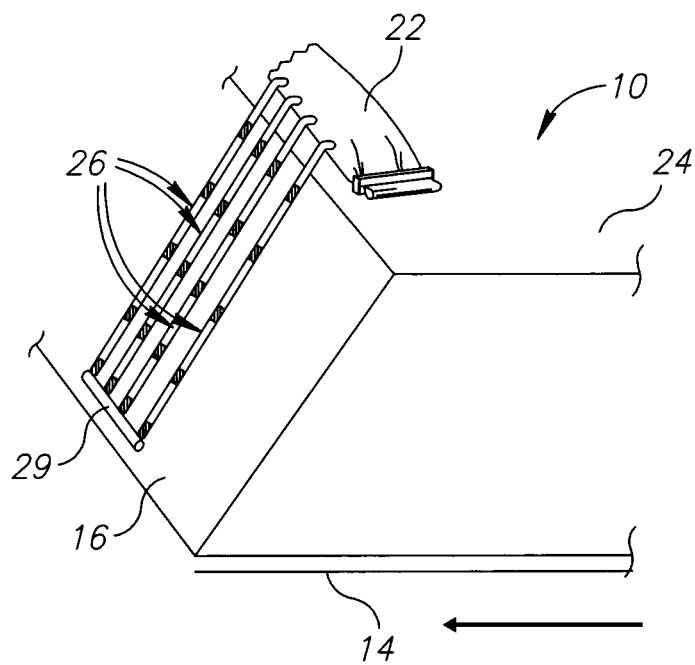
FIGS. 8 and 9 schematically show embodiments of the aeration system.

In an embodiment (see FIG. 8), the ends of the pipes 26 of a given group of aeration pipes 26 that communicate with a certain feed pipe 22 are attached to a collecting pipe 29. Such an optional collecting pipe 29 ensures that all the pipes 26 in the given group communicate with each other also at their ends so that if for example at a certain point along a given pipe 26 there is a blockage in the pipe 26 (due to for example ore that is laid thereupon) then the section of the pipe 26 beyond and down of the blockage will receive its flow of gas from the adjacent pipes 26 in the group via the collecting pipe 29.

In an embodiment, a new given feed pipe 22 that is to be added to the bed 10 may be periodically placed upon the upper face 24 of the bed 10 alongside a ridge 40 of the bed 10 where the bed's upper and leading faces 24, 16 converge. Such periodic placing may occur for example after a given pre-defined increase in the size of the bed 10 in the lateral direction has been reached due to a progression in the bed's formation along the basal layer 14. The aeration pipes 26 associated with such a new installed feed pipe 22 may be periodically laid upon the free leading face 16 of the bed 10 and additional ore being added to the bed 10 may optionally thereafter cover the newly added aeration pipes 26 so that they become buried in the bed 10.

In an embodiment, buffer material (not shown) may optionally be laid upon the free leading face 16 of the bed 10 before and/or after the aeration pipes 26 are laid thereupon. Such buffer material may function to protect the aeration pipes 26 from damage that may be caused to the pipes 26 when in contact with the ore that is being leached in the bed 10. In a bed 10 in which for example ROM raw material from the mine is deposited for leaching, the buffer material may be of a similar material that has been crushed or ground to have a granular structure with a reduced average size, volume and/or weight in relation to the ROM raw material.

The emitters 28 of each aeration pipe 26 are adapted to emit aeration gas into the bed 10 and in some embodiments of the present invention these emitters 28 may be for example in the form of holes (not shown) in the pipe 26 through which gas freely exits the pipe 26. It is noted that emitters 28 in accordance with some embodiments of the present invention may have other forms which function to allow exit of gas out of the pipe 26.

Attention is additionally drawn to FIG. 6 which schematically shows a gas emitter 28 in accordance with an embodiment of the invention with a portion of a wall 48 of the aeration pipe 26 to which it is optionally attached being partially removed. Such a gas emitter 28 may be in the form of a pressure reducing element that has an inlet 42, an outlet 44 and a flow-restricting path 46 therebetween and gas passing from the aeration pipe 26 via the inlet 42 into the emitter 28 traverses through the flow-restricting path 46 to be released at the outlet 44 of the emitter 28 at a relatively low discharge pressure generally equal to about zero. In gas emitters 28 that are optionally attached to an inner face of the wall 48 of the aeration pipe 26, the gas exiting the flow restricting path 46 at the emitter's outlet 44 is released out of the pipe 28 via a perforation (not shown) that is formed through the pipe wall 48 adjacent the emitter's outlet 44.

Gas emitters 28 in a given pipe 26 that incorporate similar flow restricting paths 46 may function to substantially emit a similar amount of gas over a defined period of time. In an embodiment where such emitters 28 are evenly spaced along the pipe 26 such emitters 28 will substantially evenly distribute the gas along the aeration pipe 26 in which they are installed.

Optionally, an aeration pipe 26 in accordance with an embodiment of the present invention may be adapted to non-evenly distribute gas along its length so that such a pipe 26 as it slopes downwards towards the basal layer 14 will for example increase the amount of gas that it emits. Such non-even distribution may be achieved by for example incorporating emitters 28 with different flow restricting paths 46 into a given pipe 26 so that emitters 28 that are located lower in the bed 10 have for example a shorter flow restricting path 46 in relation to emitters 28 that are located higher in the bed 10 and thereby allow a larger flow rate of gas to exit the pipe 26. Other ways of achieving such non-even distribution of gas along an aeration pipe 26 may include non-evenly distributing the emitters 28 along the pipe 26 so that the spacing between adjacent emitters 28 is smaller as the pipe 26 slants downwards in the bed 10.

In an embodiment, such non-even distribution may also be achieved by dividing a length of a given pipe 26 into pipe sections (not shown) that include each a set of emitters 28 that are adapted to emit each gas at a similar flow rate and assembling the given pipe 26 such that a pipe section more proximal to the basal layer 14 includes a set of emitters 28 with a higher flow rate in relation to another pipe section more distal from the basal layer 14. In an embodiment, pipe sections of a pipe 26 that are located lower in a bed 10 and more proximal to the basal layer 14 are of a type that is better adapted to withstand contact with the ore bearing thereupon. For example, a pipe section located lower in the bed 10 may have a thicker pipe wall in relation to a pipe section more distal from the basal layer 14.

A protective covering (not shown) in an optional form of a pipe sleeve may be placed upon the aeration pipe 26 optionally only at the location of each gas emitter 28 in order to protect the emitters 28 from being damaged by the ore. Such protective covering may be placed spaced out in relation to the gas emitters 28 to act as a shield for the gas emitters 28 against contact with the ore.

Attention is drawn back to FIG. 5. In a given group of aeration pipes 26 in which each pipe 26 has evenly spaced-apart emitters 28, an average effective emitter distance ED between adjacent gas emitters 28 in an aeration pipe 26 is defined measured along a direction P generally parallel to the basal layer 14; and an effective aeration pipe distance AD is defined measured also along the direction P between the beginning and the end imaginary lines 36, 38 of the given group of aeration pipes 26 that are attached to a same feed pipe 22.

A spacing S is defined as an average spacing between adjacent feed pipes 22 that extend alongside each other on the upper face 24 of the bed 10 and optionally the spacing S is defined according to an average spacing between a line passing through the starts 30 of one feed pipe 22 and a corresponding line passing through the starts 30 on an adjacent other feed pipe 22. In an embodiment, the spacing S between adjacent feed pipes 22 is optionally sized such that S≤AD+ED.

In theoretical studies of the efficiency of an aeration system in accordance with some embodiments of the invention, the inventor has determined that an additional tolerance T may in some cases be added to the above equation defining spacing S so that spacing S in these embodiments is defined as S≤AD+ED+T, where T is a tolerance distance occurring due to side dispersion of the gas flow in the bed 10. Tolerance T is dependent upon the permeability of the ore that is deposited in the bed 10 and in most cases may have a value of between 3 to 5 meters.

Spacing S in accordance with the above embodiments of the invention may ensure that gases emitted from adjacent groups of aeration pipes 26 that are associated with adjacent feed pipes 22 will overlap each other along a direction D extending generally away from the basal layer 14 or will at least form a substantially three dimensional relative even distribution of gas in the bed 10.

Attention is now drawn to FIG. 7. The recovery of metals from the bed 10 of ore may include irrigating the bed 10 with a leach lixiviant fluid solution such as a diluted cyanide solution, a sulfuric acid solution, a ferric acid solution, (etc.), in order to extract the required metals from the bed 10. An irrigation assembly 50 such as sprinklers or drip emitters may be used to irrigate the bed 10 of ore with a leach solution so that the leach solution percolating through the bed 10 will leach out the required metals from the bed 10.

The aeration system 12 in accordance with an embodiment of the present invention may enhance the leaching rate of the leaching solution percolating through the bed 10 by the introduction of gases indicated by small arrows 52 into the bed 10 via the aeration pipes 26 (it is noted that arrows 52 point up however the direction of gas flow into the bed 10 may occur also in other directions surrounding an emitter 28). Gas at an optional pressure of about 0.1 to 0.3 BAR may be blown though the aeration pipes 26 and into the bed 10 in order to increase the leaching rates and/or to control the temperature in the bed 10.

In an embodiment of the present invention, one or more irrigation assemblies 50 irrigating the bed 10 may be grouped into irrigation modules IM that are associated each with a certain portion of the bed 10 and are adapted to irrigate substantially only that portion. The index letter "i" assigned to each irrigation module IMi in FIG. 7 indicates different irrigation modules IMi that are associated with substantiality different portions of the bed 10.

In an embodiment of the present invention, the array of pipes 20 leading the gases downstream into the bed 10 may also be divided into aeration modules AM that are associated each with a certain portion of the bed 10 and are adapted to aerate substantially only that portion. The index letter "i" assigned to each aeration module AMi in FIG. 7 indicates different aeration modules AMi that are associated with substantiality different portions of the bed 10.

In accordance with an aspect of the present invention, the portion of the bed 10 being irrigated by a given irrigation module IMi is substantially similar to the portion of the bed 10 being aerated by a given aeration module AMi that has a similar index "i" so that each portion of the bed 10 of ore may be irrigated and aerated independently of the other portions for extracting metals from the ore.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the present embodiment has been described to a certain degree of particularity, it should be understood that various alterations and modifications could be made without departing from the scope of the invention as hereinafter claimed.

What is claimed is:

1. An aeration system for a bed of ore laid upon a basal layer, the bed comprising an upper face and a leading face, the aeration system comprising:
   an upstream gas source for supplying gas;
   a feed pipe configured to extend along the upper face; and
   a plurality of aeration pipes coupled to the feed pipe for distributing the gas downstream to at least a portion of the bed, wherein:
   each aeration pipe comprises spaced-apart gas emitters for the distribution of the gas to the at least a portion of the bed; and
   the aeration pipes are configured to extend through the bed from the upper face towards the basal layer.

2. The aeration system according to claim 1, wherein:
   at least some of the aeration pipes extend towards the basal layer along a path that has a slope generally similar to the slope of a leading face of the bed.

3. The aeration system according to claim 1, wherein at least some of the aeration pipes extend onwards an additional distance along the basal layer.

4. The aeration system according to claim 1, further comprising a protective covering located along at least portions of each aeration pipe for shielding the gas emitters from direct contact with the ore.

5. The aeration system according to claim 1, wherein:
   at least some of the gas emitters of each aeration pipe are covered by ore and thus function as effective emitters which emit gas into the ore;
   each aeration pipe has an effective beginning and an effective end being respectively defined at the most distal and the most proximal effective emitter from the basal layer;
   an imaginary beginning line and an imaginary end line are defined extending respectively between the effective beginnings and the effective ends of a given group of aeration pipes that are attached to the same feed pipe;
   an effective emitter distance ED between adjacent gas emitters in an aeration pipe is measured along the predetermined direction, generally parallel to the basal layer;
   an effective aeration pipe distance AD between an imaginary beginning line and an imaginary end line of a given group of aeration pipes is measured along a the predetermined direction, generally parallel to the basal layer; and
   an average spacing S between at least some adjacent feed pipes in the aeration system is sized such that S ≤AD +ED +T, where T is a tolerance distance that is less than or equal to 5 meters.

6. The aeration system according to claim 1, wherein at least some of the gas emitters are in the form of holes in the pipes through which gas freely exits the pipes.

7. The aeration system according to claim 1, wherein at least some of the gas emitters each comprise a flow-restricting path for reducing the pressure of gas exiting the emitters.

8. The aeration system according to claim 7, wherein the at least some of the gas emitters are adapted to evenly distribute gas along the pipe they are associated with.

9. The aeration system according to claim 7, wherein the at least some of the gas emitters are adapted to non-evenly distribute gas along the pipe they are associated with.

10. The aeration system according to claim 9, wherein non-even distribution is achieved by non-even spacing between at least some of those gas emitters.

11. The aeration system according to claim 9, wherein non-even distribution is achieved by different type flow-restricting paths that are comprised in at least some of those gas emitters.

12. The aeration system according to claim 1 in combination with an irrigation assembly, wherein:
the aeration system is divided into a plurality of aeration modules, each aeration module defining a respective aerated portion in the bed;
the irrigation assembly is divided into a plurality irrigation modules, each irrigation module configured to supply a leach solution to a respective irrigated portion in the bed; and
each aerated portion corresponds to an associated irrigated portion that is substantially the same portion in the bed.

13. The aeration system according to claim 1, wherein:
Ends of the aeration pipes that are opposite the feed pipe are attached to a collection pipe.

14. The aeration system according to claim 7, wherein the gas emitter is a pressure reducing element having an inlet and an outlet with the flow restricting path therebetween so that gas passing from the aeration pipe 26 to the outlet 44 is released at a relatively low discharge pressure generally equal to zero.

15. The aeration system according to claim 14, wherein the pressure reducing element is attached to an inner face of a wall of the aeration pipe.

16. A method of adding to an aeration system comprising a plurality of groups of aeration pipes configured to aerate a bed of ore laid upon a basal layer, the bed of ore being of the type that is progressively formed in a predetermined direction along the basal layer by depositing additional ore over a leading face of the bed, the method comprising the steps of:
placing an additional group of aeration pipes upon the leading face of the bed;
laying a feed pipe upon an upper face of the bed;
connecting the feed pipe to the additional group of aeration pipes, said feed pipe being in fluid communication with the aeration pipes in the additional group of aeration pipes and being adapted to supply those aeration pipes with gas;
depositing a covering layer of ore over the leading face in order to at least partially cover the group of additional aeration pipes, and
depositing additional ore to continue the progressive formation of the bed.

17. The method according to claim 16, wherein the covering layer of ore has a granular structure that is different from a granular structure of the additional ore.

18. The method according to claim 17, wherein:
the additional ore is run-of-mine raw material; and
the covering layer of ore comprises ground run-of-mine raw material.

19. The method according to claims 16, wherein the progressing leading face of the bed slopes towards the basal layer.

20. The method according to claim 16, wherein the feed pipe is a collapsible pipe.

21. An aeration system for a bed of ore laid upon a basal layer, comprising:
an upstream gas source for supplying gas;
a plurality of aeration pipes for distributing the gas downstream to at least a portion of the bed; and
feed pipes that extend along the bed of ore, each feed pipe being coupled to a given group of aeration pipes, wherein:
each aeration pipe comprises spaced-apart gas emitters for the distribution of the gas to the at least a portion of the bed;
the aeration pipes extend through the bed towards the basal layer,
at least some of the gas emitters of each aeration pipe are covered by ore and thus function as effective emitters which emit gas into the ore;
each aeration pipe has an effective beginning and an effective end being respectively defined at the most distal and the most proximal effective emitter from the basal layer;
an imaginary beginning line and an imaginary end line are defined extending respectively between the effective beginnings and the effective ends of a given group of aeration pipes that are attached to the same feed pipe;
an effective emitter distance ED between adjacent gas emitters in an aeration pipe is measured along the predetermined direction, generally parallel to the basal layer;
an effective aeration pipe distance AD between an imaginary beginning line and an imaginary end line of a given group of aeration pipes is measured along a the predetermined direction, generally parallel to the basal layer; and
an average spacing S between at least some adjacent feed pipes in the aeration system is sized such that $S \leq AD + ED + T$, where T is a tolerance distance that is less than or equal to 5 meters.

* * * * *